US009286289B2

(12) United States Patent
Minca et al.

(10) Patent No.: US 9,286,289 B2
(45) Date of Patent: Mar. 15, 2016

(54) ORDERING A LEXICON NETWORK FOR AUTOMATIC DISAMBIGUATION

(71) Applicant: SOFTWIN SRL Romania, Bucharest (RO)

(72) Inventors: Andrei Minca, Slatina (RO); Stefan S Diaconescu, Bucharest (RO); Oana A Soica, Filipestii de Padure (RO)

(73) Assignee: SOFTWIN SRL ROMANIA, Bucharest (RO)

( * ) Notice: Subject to any disclaimer, the term of this patent is extended or adjusted under 35 U.S.C. 154(b) by 311 days.

(21) Appl. No.: 13/859,611

(22) Filed: Apr. 9, 2013

(65) Prior Publication Data

US 2014/0303962 A1    Oct. 9, 2014

(51) Int. Cl.
*G06F 17/20* (2006.01)
*G06F 17/27* (2006.01)

(52) U.S. Cl.
CPC ........ *G06F 17/2785* (2013.01); *G06F 17/2735* (2013.01)

(58) Field of Classification Search
CPC ......... G06F 17/20; G06F 17/21; G06F 17/27; G06F 17/2705; G06F 17/2715; G06F 17/2735; G06F 17/2785; G06F 17/279
USPC ............................................. 704/1, 9, 10, 257
See application file for complete search history.

(56) References Cited

U.S. PATENT DOCUMENTS

| | | | |
|---|---|---|---|
| 6,278,973 B1 * | 8/2001 | Chung et al. | 704/257 |
| 6,587,844 B1 * | 7/2003 | Mohri | 706/20 |
| 6,871,199 B1 | 3/2005 | Binnig et al. | |
| 7,809,548 B2 * | 10/2010 | Mihalcea et al. | 704/1 |
| 7,899,666 B2 | 3/2011 | Varone | |
| 7,953,594 B2 * | 5/2011 | Jeong et al. | 704/10 |
| 8,285,664 B2 | 10/2012 | Ylonen | |
| 8,332,439 B2 * | 12/2012 | Marvit | G06F 17/30616 707/788 |
| 8,447,587 B2 * | 5/2013 | Kirshenbaum | G06F 17/2785 704/10 |
| 8,473,503 B2 * | 6/2013 | Cheng et al. | 707/755 |

(Continued)

FOREIGN PATENT DOCUMENTS

WO    WO2012000013 A1 *  1/2012

OTHER PUBLICATIONS

Navigli, Roberto, and Paola Velardi. "Structural semantic interconnections: a knowledge-based approach to word sense disambiguation." Pattern Analysis and Machine Intelligence, IEEE Transactions on 27.7 (2005): 1075-1086.*

(Continued)

*Primary Examiner* — Paras D Shah
(74) *Attorney, Agent, or Firm* — Law Office of Andrei D Popovici, PC

(57) ABSTRACT

Described systems and methods allow a computer system to employ a lexicon network for word sense disambiguation (WSD). In an exemplary embodiment, each node of the lexicon network represents a gloss of a lexicon entry, while an edge represents a lexical definition relationship between two glosses. The lexicon network is ordered prior to WSD, wherein ordering the lexicon network comprises arranging the nodes of the lexicon network in an ordered sequence, and removing a set of edges to eliminate loops. In some embodiments, the position of each node within the ordered sequence is determined according to a direction and a weight of an edge connected to the respective node. The weight may represent a semantic importance of the respective edge relative to other edges of the network.

20 Claims, 14 Drawing Sheets

(56) References Cited

U.S. PATENT DOCUMENTS

| | | | |
|---|---|---|---|
| 2004/0111255 A1* | 6/2004 | Huerta et al. | 704/10 |
| 2006/0074632 A1* | 4/2006 | Nanavati et al. | 704/9 |
| 2011/0040766 A1* | 2/2011 | Robinson et al. | 707/749 |
| 2011/0119049 A1 | 5/2011 | Ylonen | |
| 2011/0145184 A1* | 6/2011 | You et al. | 706/52 |
| 2011/0191175 A1 | 8/2011 | Elbaz et al. | |
| 2012/0158639 A1* | 6/2012 | Moore | G06F 17/30533 706/55 |
| 2012/0203777 A1 | 8/2012 | Jevtic et al. | |
| 2014/0071626 A1* | 3/2014 | Campbell et al. | 361/700 |
| 2014/0143280 A1* | 5/2014 | Duan et al. | 707/798 |

OTHER PUBLICATIONS

Lesk, "Automatic Sense Disambiguation Using Machine Readable Dictionaries: How to Tell a Pine Cone from an Ice Cream Cone," pp. 24-26, Bell Communications Research, Morristown, NJ, 1986.

Ide et al., "Word Sense Disambiguation with Very Large Neural Networks Extracted from Machine Readable Dictionaries," pp. 1-6, Department of Computer Science Vassar College, Poughkeepsie, New York, 1990.

Ide et al., "Word Sense Disambiguation: The State of the Art," pp. 1-41, Department of Computer Science Vassar College, Poughkeepsie, New York, 1998.

Banerjee, "Adapting the Lesk Algorithm for Word Sense Disambiguation to WordNet," pp. 1-90, University of Minnesota, Duluth, Minnesota, Dec. 2002.

Mihalcea et al., "PageRank on Semantic Networks, with Application to Word Sense Disambiguation," pp. 1-7, University of North Texas, Dallas, TX, 2004.

Navigli et al., "Structural Semantic Interconnection: a knowledge-based approach to Word Sense Disambiguation," pp. 1-4, Universita di Roma, Rome, Italy, 2004.

Schwab et al., "Conceptual Vectors, a complementary tool to Lexical Networks," pp. 1-10, Universiti Sains Malaysia, Penang, Malaysia, 2005.

Ide et al., "Word Sense Disambiguation: Text, Speech and Language Technology vol. 33," pp. 1-384, Vassar College, Poughkeepsie, New York, 2006.

Navigli et al., "Graph Connectivity Measures for Unsupervised Word Sense Disambiguation," pp. 1-6, Universita di Roma, Rome, Italy, 2007.

Agirre et al., "Using the Multilingual Central Repository for Graph-Based Word Sense Disambiguation," pp. 1-5, University of Basque Country, Donostia, Spain, 2008.

Navigli, "Using Cycles and Quasi-Cycles to Disambiguate Dictionary Glosses," pp. 1-9, Universita di Roma, Rome, Italy, 2009.

Navigli, "Word Sense Disambiguation: A Survey," pp. 1-69, Universita di Roma, Rome, Italy, 2009.

Gutierrez et al., "Improving WSD using ISR-WN with Relevant Semantic Trees and SemCor Senses Frequency," pp. 233-239, Proceedings of Recent Advances in Natural Language Processing, Hissar, Bulgaria, Sep. 2011.

Minca et al., "An Approach to Knowledge-Based Word Sense Disambiguation Using Semantic Trees Built on a WordNet Lexicon Network," pp. 1-6, Softwin, Bucharest, Romania, 2011.

Diaconescu et al., "Complex Natural Language Processing System Archhitecture," Advances in Spoken Language Technology, The Publishing House of the Romanian Academy, Bucharest, 2007, p. 228-240.

Diaconescu, Natural Language Processing Using Generative Indirect Dependency Grammar, Proceedings of the International IIS: IIPWM'04 Conference, Zakopane, Poland, May 17-20, 2004, Springer, p. 414-418.

Diaconescu, "Natural Language Understanding Using Generative Dependency Grammar," Research and Development in Intelligent Systems XIX, Proceedings of ES2002, the Twenty second SGAI International Conference on Knowledge Based Systems and Applied Artificial Intelligence, Cambridge UK, Dec. 2002, Springer p. 439-452.

Diaconescu, "Natural Language Syntax Description using Generative Dependency Grammar," POLIBITS 38, p. 5-18, Jul.-Dec. 2008.

Ponzetto et al., "Knowledge-rich Word Sense Disambiguation rivaling supervised systems," Proceedings of the 48th Annual Meeting of the Associated for Computational Linguistics (ACL), p. 1522-1531, 2010.

European Patent Office, International Search Report for PCT International Application No. PCT/RO2014/000012, international filing date Mar. 17, 2014, priority date Apr. 9, 2013.

European Patent Office, Written Opinion for PCT International Application No. PCT/RO2014/000012, international filing date Mar. 17, 2014, priority date Apr. 9, 2013.

European Patent Office, International Preliminary Report on Patentability for PCT International Application No. PCT/RO2014/000012, international filing date Mar. 17, 2014, priority date Apr. 9, 2013.

Ene et al., "Wordnet", retrieved on Dec. 30, 2015 from http://www.cs.princeton.edu/courses/archive/spr07/cos226/assignments/wordnet.html, page contains copyright notice Copyright © 2006.

Banerjee et al., "An adapted Lesk algorithm for word sense disambiguation using WordNet," CICLing '02 Proceedings of the Third International Conference on Computational Linguistics and Intelligent Text Processing, Jan. 2002, pp. 136-145, retrieved on Dec. 30, 2015 from https://www.researchgate.net/profile/Ted_Pedersen/publication/221629283_An_Adapted_Lesk_Algorithm_for_Word_Sense_Disambiguation_Using_WordNet/inks/00b49520c59263f13e000000.pdf.

* cited by examiner

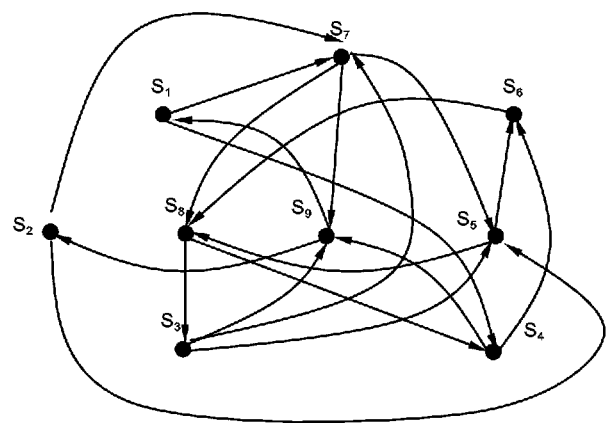
FIG. 10-A
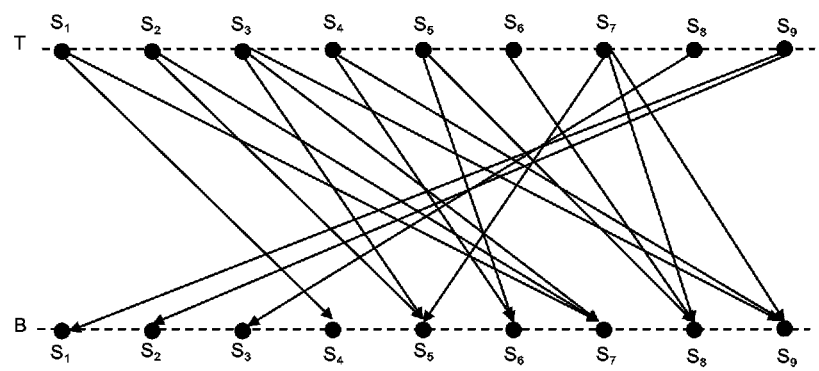
FIG. 10-B

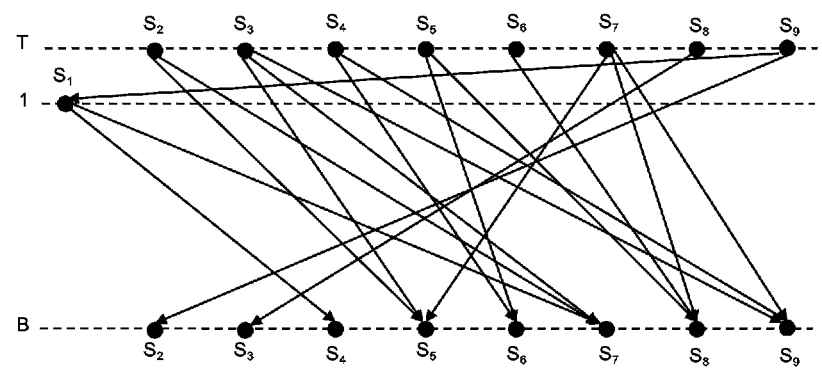
FIG. 10-C
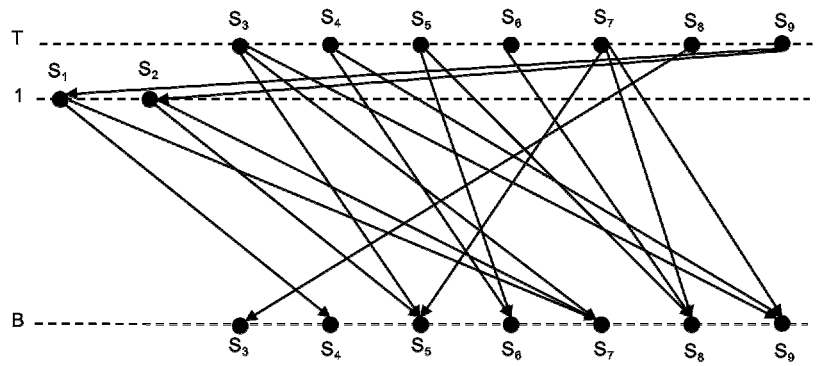
FIG. 10-D

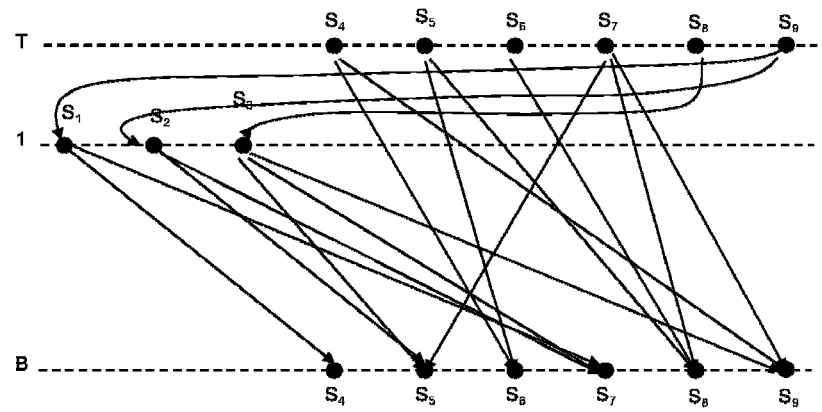
FIG. 10-E
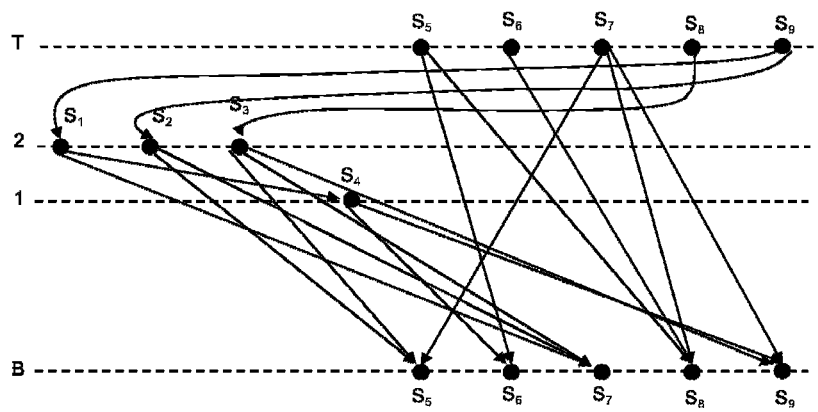
FIG. 10-F

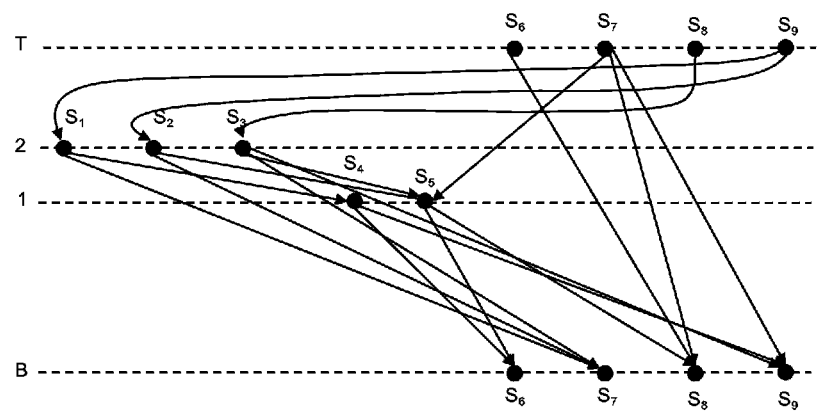
FIG. 10-G
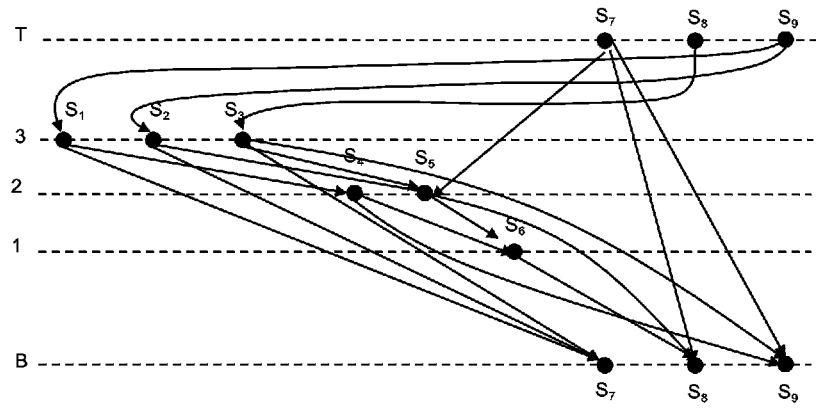
FIG. 10-H

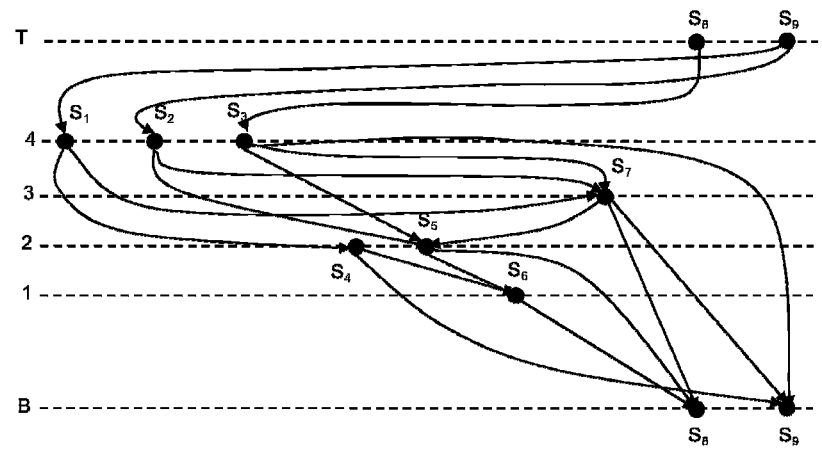
FIG. 10-I
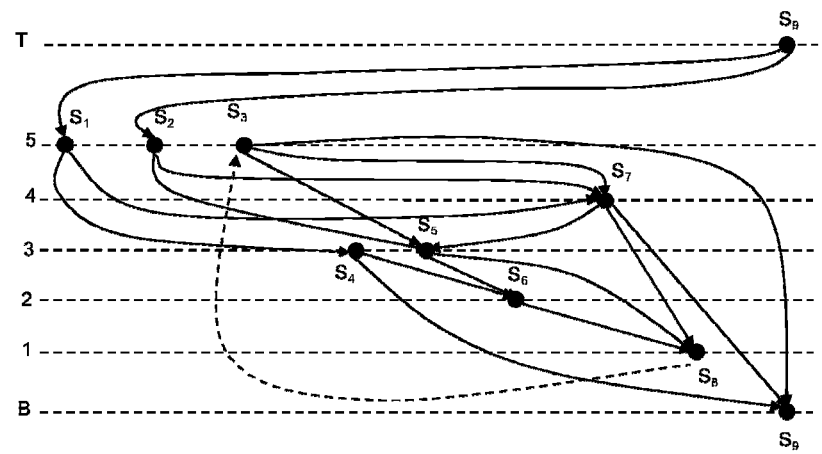
FIG. 10-J

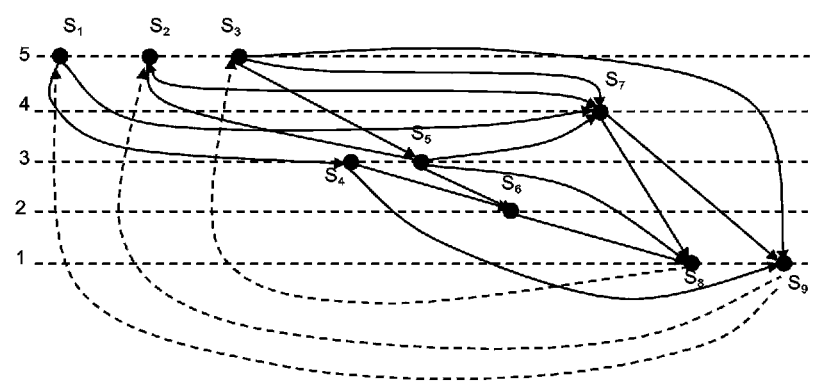
FIG. 10-K

ORDERING A LEXICON NETWORK FOR AUTOMATIC DISAMBIGUATION

BACKGROUND

The invention relates to systems and methods for computer processing of natural languages, and in particular to systems and methods for automatic word sense disambiguation.

Interest in natural language processing (NLP) has been steadily increasing in recent years. Globalization and the widespread use of the Internet are driving the development of automated translation technology. The popularity of mobile and wearable computing devices, coupled to the progress of artificial intelligence and software engineering, are fueling growth in the area of human-machine interfaces, such as speech and handwriting recognition, among others.

Automated language processing has long been considered difficult because of the diversity, inherent ambiguity, context-sensitivity, and redundancy of human language. A particular task is word sense disambiguation (WSD), comprising automatically determining a sense or meaning of a word in the context of a natural language communication.

Common language-processing applications use computer-readable linguistic knowledge bases (LKB) containing information on the lexicon and grammar of a natural language. Some LKBs also include semantic information, which may be used for WSD applications. Creation of such knowledge bases typically involves dictionary-based and corpus-based methods. Dictionary-based methods may comprise assembling a lexicon and manually or semi-automatically annotating lexicon entries with various linguistic and/or semantic information. Corpus-based methods often employ statistical data gathered from various corpora of natural language text to automatically determine linguistic and/or semantic relationships between lexicon entries.

SUMMARY

According to one aspect, a computer system comprises at least one processor configured to transform a lexicon network, the lexicon network comprising a set of nodes and a set of edges. Each node of the lexicon network comprises a gloss of a lexicon entry of a natural language. Each edge of the lexicon network comprises a direction and a weight, the weight indicative of a semantic importance of each edge, compared to other edges of the lexicon network. Transforming the lexicon network comprises assigning a first node of the lexicon network to a first level of a plurality of levels, the plurality of levels arranged in an ordered sequence, and wherein assigning the first node comprises selecting the first level from the plurality of levels according to a direction of a first edge of the lexicon network, the first edge connected to the first node, and further according to a weight of the first edge.

According to another aspect, a method comprises employing at least one processor of a computer system to transform a lexicon network, the lexicon network comprising a set of nodes and a set of edges. Each node of the lexicon network comprises a gloss of a lexicon entry of a natural language. Each edge of the lexicon network comprises a direction and a weight, the weight indicative of a semantic importance of each edge, compared to other edges of the lexicon network. Transforming the lexicon network comprises employing the at least one processor to assign a first node of the lexicon network to a first level of a plurality of levels, the plurality of levels arranged in an ordered sequence, and wherein assigning the first node comprises selecting the first level from the plurality of levels according to a direction of a first edge of the lexicon network, the first edge connected to the first node, and further according to a weight of the first edge.

According to another aspect, a computer system comprises at least one processor configured to transform a lexicon network into a directed acyclic graph. Each node of the lexicon network comprises a gloss of a lexicon entry of a natural language. Each edge of the lexicon network comprises a direction and a weight, the weight indicative of a semantic importance of each edge, compared to other edges of the lexicon network. Transforming the lexicon network comprises selectively removing a subset of edges of the lexicon network, wherein selectively removing the subset of edges comprises selecting a target edge into the subset of edges selected for removal according to a direction of the target edge and further according to a weight of the target edge.

According to another aspect, a client computer system comprises at least one processor configured to receive from a server computer system a semantic indicator determined for a lexicon network of a natural language, the server computer system configured to perform transactions with a plurality of computer systems comprising the client computer system, wherein determining the semantic indicator comprises transforming the lexicon network. Each node of the lexicon network comprises a gloss of a lexicon entry of a natural language. Each edge of the lexicon network comprises a direction and a weight, the weight indicative of a semantic importance of each edge, compared to other edges of the lexicon network. Transforming the lexicon network comprises assigning a first node of the lexicon network to a first level of a plurality of levels, the plurality of levels arranged in an ordered sequence, and wherein assigning the first node comprises selecting the first level from the plurality of levels according to a direction of a first edge of the lexicon network, the first edge connected to the first node, and further according to a weight of the first edge. The at least one processor is configured, in response to receiving the semantic indicator, to determine a disambiguation of a text block formulated in the natural language, the disambiguation indicative of a sense of a token of the text block, the disambiguation determined according to the semantic indicator.

BRIEF DESCRIPTION OF THE DRAWINGS

The foregoing aspects and advantages of the present invention will become better understood upon reading the following detailed description and upon reference to the drawings where:

FIG. 10-A illustrates an exemplary unordered lexicon network according to some embodiments of the present invention.

FIGS. 10-B-J show a stepwise progress of an exemplary network ordering algorithm performed according to some embodiments of the present invention, and applied to the exemplary network of FIG. 10-A.

FIG. 10-K shows an exemplary ordered lexicon network determined by processing the exemplary network of FIG. 10-A according to the sequence of steps illustrated in FIGS. 10-B-J.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
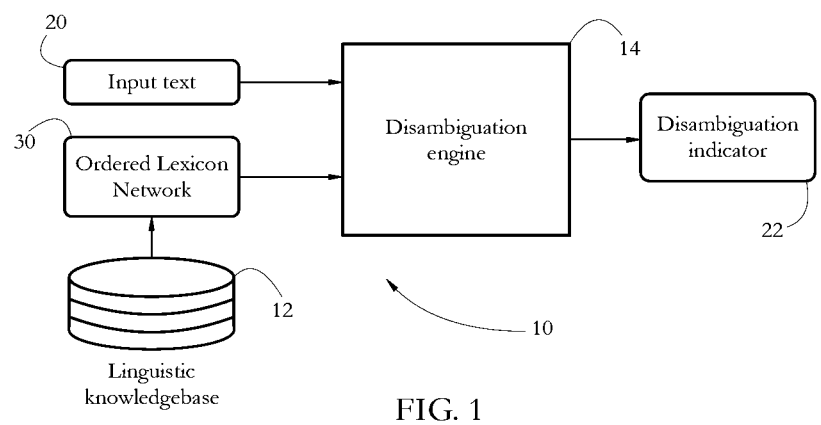
FIG. 1 shows an exemplary word sense disambiguation system according to some embodiments of the present invention.

FIG. 1 shows an exemplary word sense disambiguation (WSD) system 10 according to some embodiments of the present invention. System 10 comprises a disambiguation engine 14 connected to a linguistic knowledgebase (LKB) 12. Disambiguation engine 14 may be a computer system configured to perform word sense disambiguation operations, as described below. Engine 14 receives an input text 20 comprising a text block such as a fragment of a communication formulated in a natural language. Exemplary natural languages include English and Romanian, among others. Engine 14 outputs a disambiguation indicator 22 determined for input text 20. To produce disambiguation indicator 22, engine 14 employs data of an ordered lexicon network (OLN) 30. In an exemplary embodiment, OLN data may be selectively retrieved from linguistic knowledgebase 12 using any method known in the art, for instance using database queries.

In some embodiments, disambiguation indicator 22 comprises a set of sense indicators, each sense indicator determined for a token, such as an individual word or a sequence of words, of input text 20. Each such sense indicator may indicate a sense (meaning) with which the respective token is used in input text 20. In one example, input text 20 includes the sentence "I went fishing for my wallet"; a sense indicator determined for the word "fishing" may indicate that the respective word is used with the meaning "search by groping or feeling for something concealed", and not with the meaning "catch or try to catch fish". An exemplary disambiguation indicator 22 may include a tuple $\{S_1, S_2, \ldots, S_n\}$, or a tuple $\{T_1\text{-}S_1, T_2\text{-}S_2, \ldots, T_n\text{-}S_n\}$, wherein $T_i$ (i=1, 2, . . . , n) denote tokens of input text 20, and $S_i$ denote sense indicators, $S_i$ indicative of a sense of token $T_i$ in the context of input text 20. An exemplary sense indicator $S_i$ comprises a gloss of a lexicon entry corresponding to token $T_i$. The respective lexicon entry may be a lemma of token $T_i$, for instance an uninflected form of token $T_i$.

In some embodiments, LKB 12 comprises a computer-readable data structure describing a plurality of lexicon entries and a plurality of semantic entries, among others. LKB 12 may use any data format know in the art, for instance a table format such as a relational database (RDB), or a standard generalized markup language (SGML) format such as XML.

Lexicon entries of LKB 12 may include word, morpheme, and multiword entries. Word entries may comprise lexical data describing individual words of a natural language. Morpheme entries may include data describing linguistic entities such as prefixes, suffixes, and auxiliaries, among others, which are typically used to generate inflections of words and multiword entities. Multiword entries may comprise lexical data corresponding to multiword expressions (MWE), among others. A multiword expression may be any meaningful sequence of words in a natural language, whose multiword quality does not stem from inflection alone. The sequence of words forming a MWE is used as a whole, the meaning of which may be distinct from that of its constituent words and/or from the literal meaning of the MWE. Examples of MWEs include composite words (e.g. high-risk, to finger-point, member of parliament, chief executive officer, expectation value), phrasal constructions such as propositional verbs (e.g. to put off, to stumble upon, to look after), and idiomatic phrases (e.g. turn of phrase, to hit the nail on the head, to pass the buck, to kick the bucket), among others.

In some embodiments, lexical data describing a lexicon entry comprises a lemma and a set of supplements and/or additional word forms, such as inflections of the respective lemma. Typically, the lemma is a canonical, dictionary form of the word. For instance, for nouns, the lemma may be the nominative singular form of the word, while for verbs it may be the infinitive form. The morphological form of the lemma may be chosen by convention, and may vary between languages. In some embodiments, the lemma of a single word entry may comprise multiple words. For example, in English, the infinitive of verbs is accompanied by the particle "to", e.g. to fly, to read. The lemma of an adjective is usually the nominative-masculine-singular form of the respective adjective; in some embodiments, the lexicon entry for an adjective also includes a nominative-masculine-plural, a nominative-feminine-singular, and/or a nominative-feminine-plural form of the same adjective.

In some embodiments, each lexicon entry in LKB 12 comprises a text representation of the respective entry (e.g., word) in the respective language, and a set of additional data related to the entry. Examples of such data include: phonetic transcriptions, indicators of etymology (which may include text representations in the language of origin), indicators of time or period (e.g., for archaic word forms), and indicators of specific areas of use (e.g. seamanship, biotechnology, slang, etc.), among others.

In some embodiments, a lexicon entry of LKB 12 further comprises a sense indicator, such as a gloss of the respective entry. An exemplary gloss comprises a dictionary definition of the respective entry (word, multi-word expression, etc.), indicating a meaning of the respective entry in the respective natural language. A lexicon entry may have a plurality of glosses, each describing a possibly distinct meaning of the entry. For instance, the entry for "palm" may include the following glosses: "evergreen tropical tree", "inner surface of the hand", "to conceal in the hand", and "to deflect (a ball) with the palm of the hand", among others.

In some embodiments, a semantic entry of LKB 12 comprises an indicator of a semantic relationship between two lexicon entries of LKB 12. Exemplary semantic relationships between an item A and an item B include: synonymy (A denotes the same as B), antonymy (A denotes the opposite of B), meronymy (A is part of B), holonymy (B is part of A), and hyponymy (A is a kind of B), among others. Such semantic relationships may be symmetric (e.g., synonymy) or asymmetric (e.g., hyponymy). Asymmetric relationships typically include a direction assigned through a convention; such directionality is often depicted in the art as an arrow. For example, "A is a kind of B" may be represented as A→B. Unless otherwise specified, instances wherein A→B will be referred to as "A points to B". Unless otherwise specified, A will be referred to as a source or input of the relationship A→B, and B as a destination or output of the relationship A→B.

An exemplary indicator of a semantic relationship may include an indicator of each participant in the respective relationship (e.g., a record number or hash index of the respective lexicon entry), an indicator of a kind of relationship (e.g., synonymy, hyponymy, etc.), and a direction indicator, among others.

Figure 2:
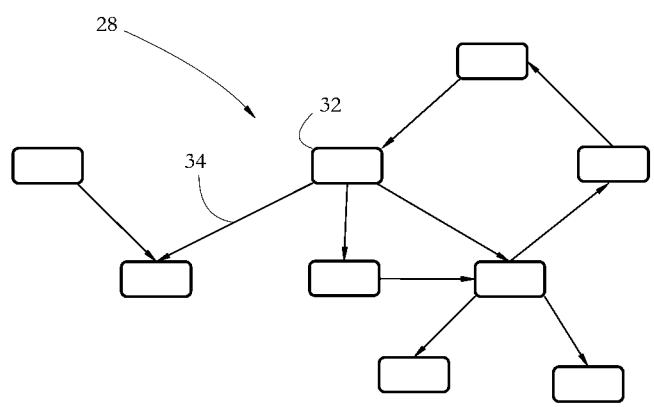
FIG. 2 illustrates a generic semantic network according to some embodiments of the present invention.

A set of relationships constructed over a lexicon is commonly known in the art as a lexicon network. In the terminology of networks, relationships are typically called edges, and entities connected by an edge are called nodes. FIG. 2 shows such an exemplary lexicon network 28 according to some embodiments of the present invention. Network 28 comprises a directed graph including a set of nodes 32 (e.g., lexicon entries of LKB 12), interconnected by a set of edges 34 (e.g., asymmetric semantic relationships between the respective nodes).

Figure 3:
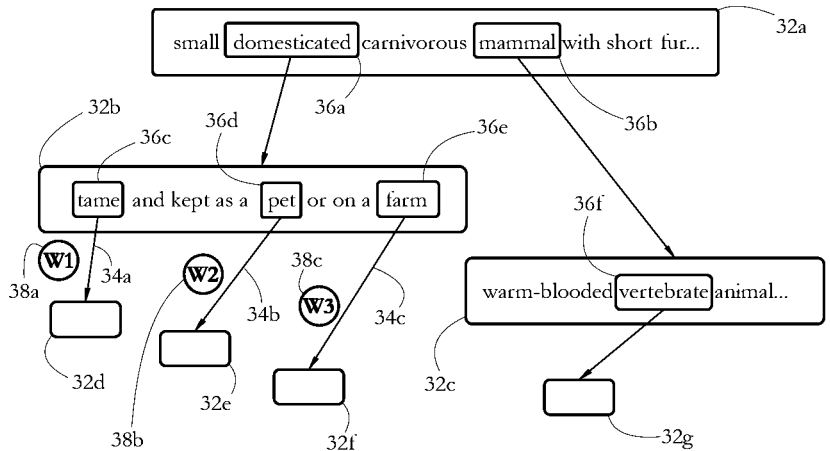
FIG. 3 shows a fragment of an exemplary lexicon network, according to some embodiments of the present invention.

A particular kind of lexicon network comprises a set of edges, wherein each edge represents a lexical definition relationship between two lexicon entries of LKB 12. In some embodiments of the present invention, a lexical definition relationship between an entry A and an entry B connects a gloss $G_A$ of entry A to a gloss $G_B$ of entry B. An example of such lexical definition is of the type "$G_A$ is defined by $G_B$", denoted $G_A \rightarrow G_B$, wherein a token of $G_A$ is used with the sense (meaning) $G_B$. An example of such relationships is illustrated in FIG. 3, wherein gloss 32a is defined by glosses 32b and 32c, in that a token 36a is used in gloss 32a with the sense 32b, and a token 36b is used in gloss 32b with the sense 32c. Similarly, gloss 32b is defined by glosses 32d-e-f, while gloss 32c is defined by gloss 32g.

In some embodiments, a lexicon network edge may include a numerical indicator referred to as a weight of the respective edge. For instance, in FIG. 3, edges 34a-c have weights 38a-c, respectively. The weight of an edge may quantify a semantic importance of the respective edge, compared to other edges of the network. In the example of FIG. 3, the word "tame" may be deemed more significant than the word "farm" in determining the meaning (gloss) 32b; in some embodiments the respective weights may be chosen so that $W_1 > W_3$. Weights may be normalized, so that all weights of edges having a common source node add up to a predetermined upper normalization constant. For instance, in FIG. 3, weights may be normalized so that $W_1 + W_2 + W_3 = 1$. In other embodiments, weights are not normalized, but may take one of a predetermined set of values. For instance, an edge may be strong, moderate, or weak. Exemplary weight values are 0.2 (20%) for weak, 0.8 (80%) for moderate, and 1.0 (100%) for strong edges.

To determine disambiguation indicator 22 (FIG. 1), disambiguation engine 14 may employ any WSD method known in the art. In an exemplary embodiment, operation of engine 14 may include the steps of:

1) tokenization, comprising identifying a set of tokens of input text 20. In some embodiments, tokens are individual words of input text 20;
2) for each token of the set of tokens, looking up a lexicon entry of the respective token in LKB 12, and then looking up a set of glosses (i.e., possible meanings) of the respective lexicon entry;
3) for each pair of tokens, selecting a gloss from the respective set of glosses of each token of the pair, to form a pair of glosses. For each such pair of glosses, engine 14 may compute a semantic distance indicative of a degree of similarity between the respective pair of glosses. Computing a semantic distance for each pair of tokens generates a matrix of semantic distances;
4) determining, according to the matrix of semantic distances, a disambiguation indicator of input text 20. Such determinations may proceed according to the assumption that a strong similarity (e.g., small semantic distance) between a pair of glosses indicates a likelihood that the respective tokens are used within text 20 with the senses given by the respective glosses.

In some embodiments, determining a semantic distance separating a pair of glosses of a pair of tokens of input text 20 (step 3 above) further comprises determining, for each gloss of the respective pair of glosses, a semantic signature of the respective gloss. In some embodiments, the semantic signature comprises a subset of ordered lexicon network 30, such as a subset of nodes of OLN 30, connected by a subset of edges of OLN 30. An exemplary semantic signature of a gloss is a tree of nodes of OLN 30 having the respective gloss as root. Another example of semantic signature is a sequence of nodes and edges starting with the respective gloss. In such embodiments, computing the semantic distance between the respective pair of glosses may comprise determining a distance between two graphs; several such methods are known in the art.

Figure 4:
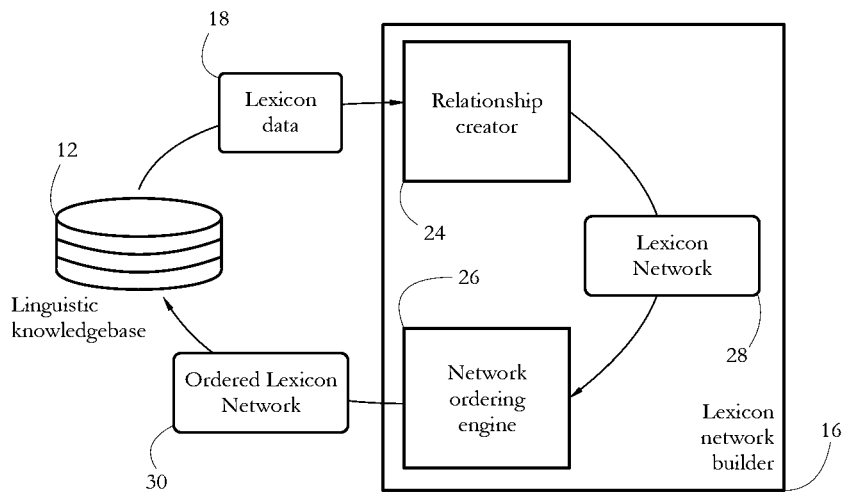
FIG. 4 shows an exemplary system for constructing an ordered lexicon network according to some embodiments of the present invention.

FIG. 4 shows an exemplary system for constructing ordered lexicon network 30 (FIG. 1), according to some embodiments of the present invention. A lexicon network builder 16 may represent a computer system configured to perform lexicon network manipulations as shown below.

Builder 16 comprises a relationship creator 24 and a network ordering engine 26 connected to relationship creator 24. Builder 16 may be configured to receive or selectively retrieve a set of lexicon data 18 from linguistic knowledgebase 12, and to output ordered lexicon network 30 to LKB 12.

In some embodiments, constructing OLN 30 comprises employing relationship creator 24 to produce lexicon network 28, and then employing network ordering engine 26 to transform network 28 into OLN 30. Lexicon network 28 may be constructed using any method known in the art. A typical scenario includes having a human operator (e.g., a linguist) use a software component of relationship creator 24, such as a graphical user interface, to select a pair of lexicon entries from LKB 12 and define a semantic relationship between the respective pair, an operation commonly known in the art as semantic annotation. In an embodiment using lexical definition relationships, the operator may select a gloss $G_A$ of a lexicon entry A, may select a token from gloss $G_A$, and according to the respective token, selectively retrieve a gloss $G_B$ of the lexicon entry B corresponding to the respective token. Then, the operator may indicate a type and/or direction of the semantic relationship connecting entries A and B, for instance $G_A \rightarrow G_B$ (gloss $G_B$ defines gloss $G_A$). Repeating the sequence of operations described above for each of a plurality of lexicon entries of LKB 12 produces lexicon network 28. In some embodiments, network 28 is represented as a data structure comprising a plurality of semantic entries, each semantic entry describing a relationship (edge) between a pair of lexicon entries (nodes), each semantic entry including, for instance, an indicator of an origin node, an indicator of a destination node, and an indicator of a type and/or direction of the relationship connecting the respective pair of nodes.

In some embodiments, OLN 30 comprises a directed acyclic graph consisting of a subset of lexicon network 28, the subset containing no loops (directed cycles), i.e., there is no way to start at some node of OLN 30 and follow a sequence of directed edges that eventually loops back to the respective node. In some embodiments, OLN 30 comprises all nodes of network 28, but only a selected subset of edges of network 28, wherein the subset was selected so as to eliminate any loops existing in network 28.

To produce OLN 30, engine 26 may transform network 28 using a topological ordering algorithm, also known in the art as a topological sort. In some embodiments, topological ordering comprises arranging a set of nodes of network 28 in an ordered sequence, so that all edges connecting the respective nodes point in a direction consistent with the order of the sequence. The position of each node within the sequence may be determined according to the direction of the edges having the respective node as input or output (i.e., going into and out of the respective node), so that, for instance, a source node of an edge must always precede in the sequence the destination node of the respective edge. In an alternative embodiment (reverse sort), a destination node of an edge must always precede in the sequence the source node of the respective edge. When there exist edges of network 28, which do not allow such an ordering of nodes consistent with the direction of the edges (for instance when network 28 contains loops), one or more edges may be removed to produce a consistent ordering of nodes, corresponding to a lexicon network with no loops.

In some embodiments, the position of a node within the sequence is determined according to the weight of an edge connected to the respective node. The respective position may be determined according to an algorithm that favors a re-arranging of nodes over removing an important edge.

An exemplary method for producing OLN 30 comprises assigning each node of lexicon network 28 to one of a set of levels, the levels forming an ordered sequence, so that each level is indicative of a position within the sequence. In some embodiments, each node of network 28 is assigned to a level of the ordered sequence, according to the direction of edges going into and out of the respective node, and further according to the weight of the respective edges.

In an exemplary embodiment, the ordered sequence of levels comprises a sequence of ascending levels $\{L_1, L_2, \ldots, L_n\}$, each level $L_i$ placed below level $L_{i+1}$ and above level $L_{i-1}$. Node-to level assignment may proceed according to a prescription, wherein when $A \rightarrow B$, node A is placed on a level $L_i$ and node B is placed on a level $L_j$ above $L_i$. When such an arrangement is incompatible with the direction of all edges of network 28, some nodes may be moved to other levels and/or some edges may be removed, so that all edges of OLN 30 consistently point in one direction (in this example, upward). An alternative node-to-level assignment may place all nodes B (such that $A \rightarrow B$) on levels $L_k$ below $L_i$, in which case all edges of OLN 30 point downward.

A person skilled in the art will appreciate that ascending levels are just one of many possible ways to represent an ordered sequence. The following description will use this kind of representation for simplicity and illustrative purposes; the algorithms used in some embodiments of the present invention may be easily modified to replace a level with an alternative indicator of the position of a node within an ordered sequence.

Figure 5:
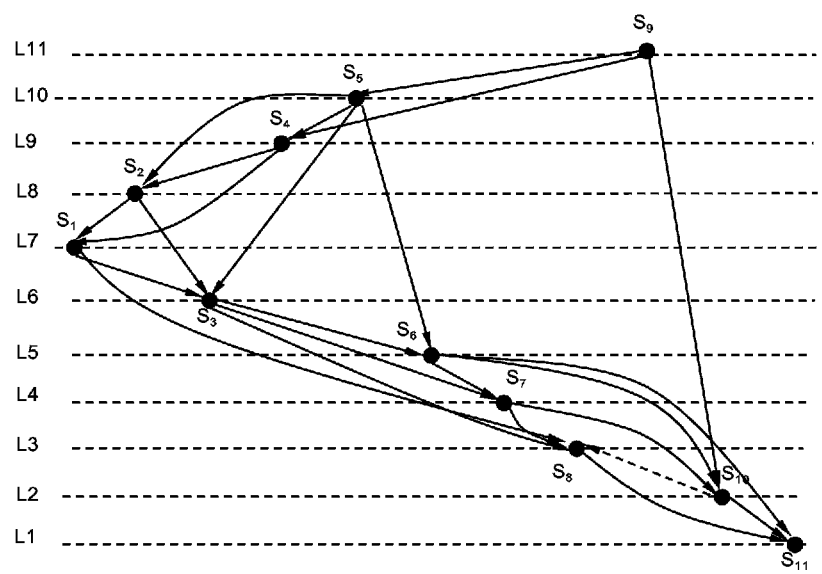
FIG. 5 shows an exemplary ordered lexicon network according to some embodiments of the present invention.

FIG. 5 shows an exemplary ordered lexicon network constructed according to some embodiments of the present invention. A set of nodes $S_1$-$S_{11}$ representing various senses (glosses) are assigned to a set of ascending levels $L_1$-$L_{11}$, so that all edges connecting nodes $S_1$-$S_{11}$ point downward. In the example of FIG. 5, each level is occupied by only one node; in some embodiments, more than one node may occupy the same level.

FIG. 5 also illustrates a set of nodes with particular properties. A node of OLN 30, which is not the origin of any edge, is commonly known as a primitive; an example of primitive is node $S_{11}$ in FIG. 5. A node, which is not the destination of any edge, is commonly known as a universal; an exemplary universal is node $S_9$. Identifying a node as a primitive or as a universal may not be possible within unordered lexicon network 28; it may become such only after a removal of edges performed as part of ordering network 28.

In addition to removing loops, the transformation of network 28 into OLN 30 may proceed according to a network optimization criterion, such as minimizing or maximizing the number of levels, minimizing the number of primitives and/or universals, and minimizing the number of removed edges, among others. Some embodiments may use an optimization criterion which combines several of the criteria enumerated above.

Figure 6:
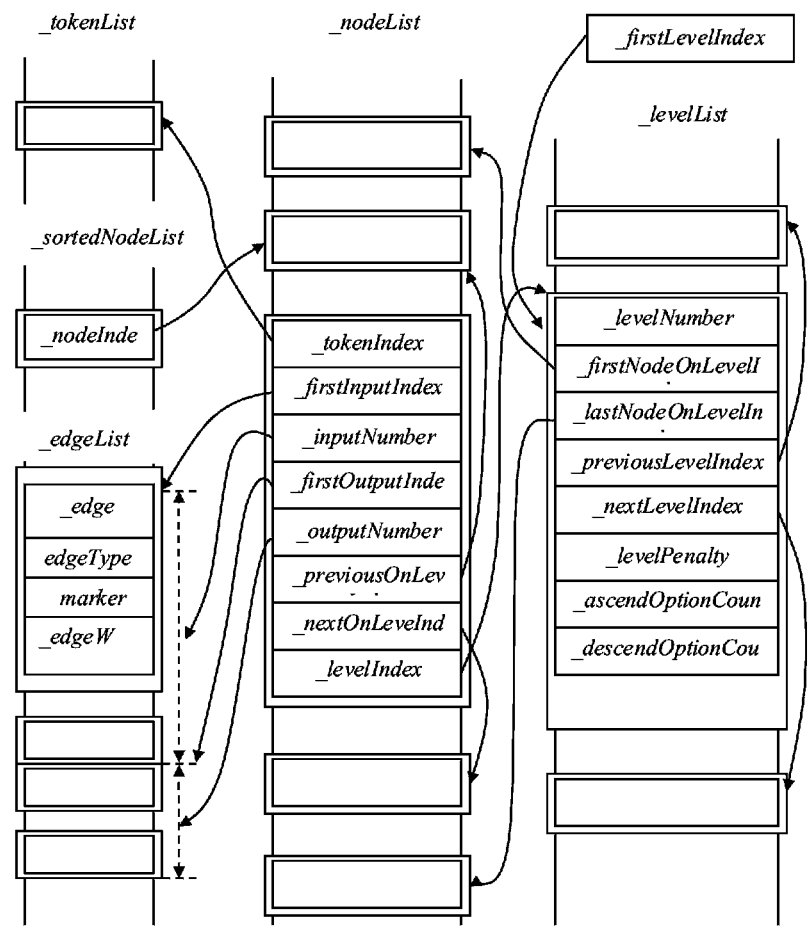
FIG. 6 illustrates exemplary data structures used in creating an ordered lexicon network according to some embodiments of the present invention.

FIG. 6 shows an exemplary set of data objects used by network ordering engine 26 to represent lexicon network 28 in the process of transformation to ordered lexicon network 30, as well as a set of references between said data objects, the references illustrated as arrows. In some embodiments, such data objects include:

1) a _tokenList structure comprising a list of tokens represented by the nodes of network 28 (the nodes may represent glosses of the respective tokens);
2) a _nodeList structure comprising a list of node objects, each node object describing a node of network 28. Each node object comprises a set of property fields, such as an indicator of how many edges point to the respective node (_inputNumber), an indicator of how many edges originate at the respective node (_outputNumber), an identification indicator of another node occupying the same level as the respective node (_previousOnLevelIndex), and an indicator of the level that the respective node is currently assigned to (_levelIndex), among others.

3) an _edgeList structure comprising a list of edge objects, each list object describing an edge of network 28. Each edge object comprises a set of property fields, such as an identifier (e.g., index) of the origin and/or destination of the respective edge (_edge), and an indicator of the weight of the respective edge (_edgeW). For edge weights, see e.g., items 38a-c in FIG. 3.

4) a _levelList structure comprising a list of level objects, each level object describing a level of OLN 30 (in alternative embodiments, the level may be replaced by another indicator of a position within an ordered sequence). Exemplary property fields of a level object include an indicator of how many nodes already assigned to a level are origins for edges pointing to the node currently being assigned (_ascendOptionCounter), an indicator of how many nodes already assigned to a level are destinations for edges originating at the node currently being assigned (_descendOptionCounter), and an indicator of a penalty incurred by assigning the current node to a level (_levelPenalty). In some embodiments, the penalty may be determined according to a count of edges that must be removed if the current node is assigned to the respective level, and/or according to the weight of the respective edges.

Figure 7:
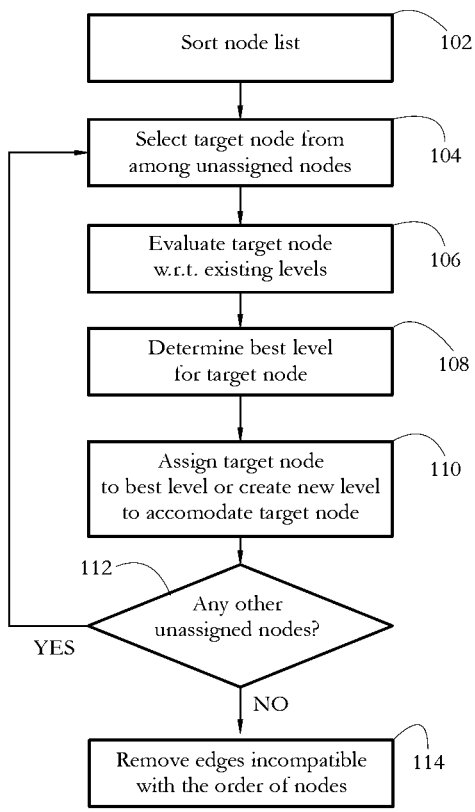
FIG. 7 shows an exemplary sequence of steps performed by the network ordering engine of FIG. 4 according to some embodiments of the present invention.

FIG. 7 shows an exemplary sequence of steps performed by network ordering engine 26 to transform network 28 into OLN 30, according to some embodiments of the present invention. In a step 102, engine 26 may sort the nodes of network 28 to indicate an order in which the respective nodes will be processed. In some embodiments, nodes may be sorted according to the number of edges going into or out of the respective node, according to a weight or cumulative weight of edges going into or out of the respective node, or according to a combination of such criteria. An exemplary step 102 may sort nodes according to a cumulative weight of incoming edges (descending), and subsequently according to a count of incoming edges (ascending).

Next, engine 26 may execute a sequence of steps 104-112 repeatedly, until all nodes of network 28 are assigned to levels. In a step 104, engine 26 may select a target node from the set of nodes currently unassigned to levels. In a step 116, the target node is assessed with respect to the existing set of levels, to determine a likely position for the target node. As part of step 116, for each node already assigned to each existing level, engine 26 may verify whether the respective node shares an edge with the target node, and determine according to the direction of such an edge whether the target node should be placed on a level higher or lower than the level occupied by the respective node. Engine 26 may also determine how much of a penalty such a placement may incur in terms of edges which need to be removed in order for the sequence of nodes of OLN 30 to be consistent with the direction of the edges of OLN 30.

Figure 8:
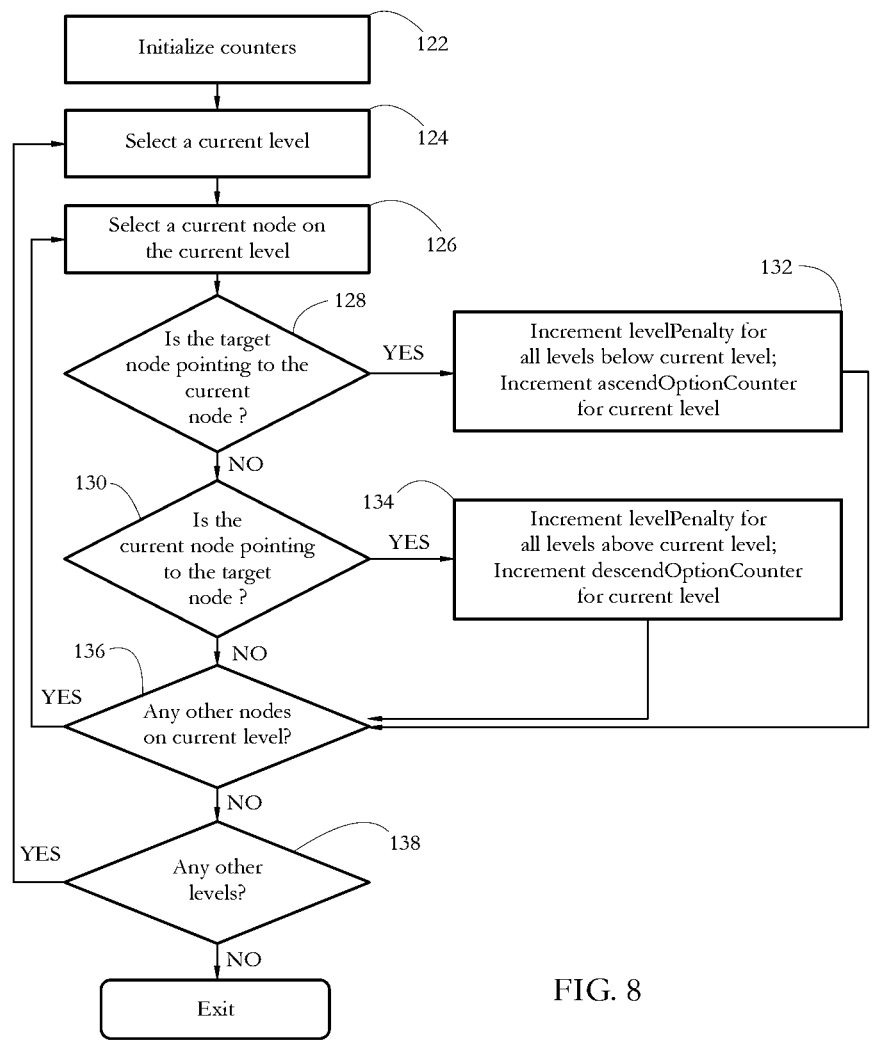
FIG. 8 shows an exemplary sequence of steps performed by the network ordering engine to assess a node with respect to a set of levels according to some embodiments of the present invention.

FIG. 8 shows an exemplary sequence of steps performed by engine 26 in order to execute step 116 in FIG. 7. In a step 122, engine 26 may initialize counters such as _ascendLevelCounter and _levelPenalty, among others. A sequence of steps 126-136 is executed in a loop for each level (termed current level) and each node (termed current node) already assigned to the current level. In a step 126, network ordering engine 26 determines whether the target node is pointing to the current node (i.e., the current node is the destination of an edge originating at the target node). If yes, in a step 132, engine 26 may record the fact that the target node should be placed on a level higher than the current level. Such recording may be achieved, for instance, by incrementing _ascendOptionCounter for the current level. In step 132, engine 26 may also indicate that placing the target node on a level lower than the current level will result in removal of the respective edge pointing from the current node to the target node. For instance, engine 26 may increment _levelPenalty for all levels below the current level. In some embodiments, the penalty indicator is incremented by a value determined according to the weight of the respective edge.

When the target node is not pointing to the current node, a step 130 determines whether the current node is pointing to the target node (i.e., there exists an edge originating at the current node, and having the target node as destination). If yes, in a step 134, engine 26 may record the fact that the target node should be placed on a level lower than the current level by e.g., incrementing _descendOptionCounter for the current level. In step 134, engine 26 may also indicate that placing the target node on a level higher than the current level will result in removal of the respective edge pointing from the target node to the current node. For instance, engine 26 may increment _levelPenalty for all levels above the current level, by a value determined according to the weight of the respective edge.

Having evaluated the target node with respect to all nodes already assigned to levels, in a step 108 (FIG. 7) engine 26 may decide on an optimal placement of the target node. In some embodiments, step 108 comprises selecting a best level from the set of existing levels according to the penalty incurred by placing of the target node on the respective level, said penalty evaluated in terms of the count and/or importance of edges which need to be removed from network 28 to obtain an ordered network wherein the sequence of nodes is consistent with the direction of the edges. Step 108 may comprise selecting as best level the level with the lower _levelPenalty counter.

Figure 9:
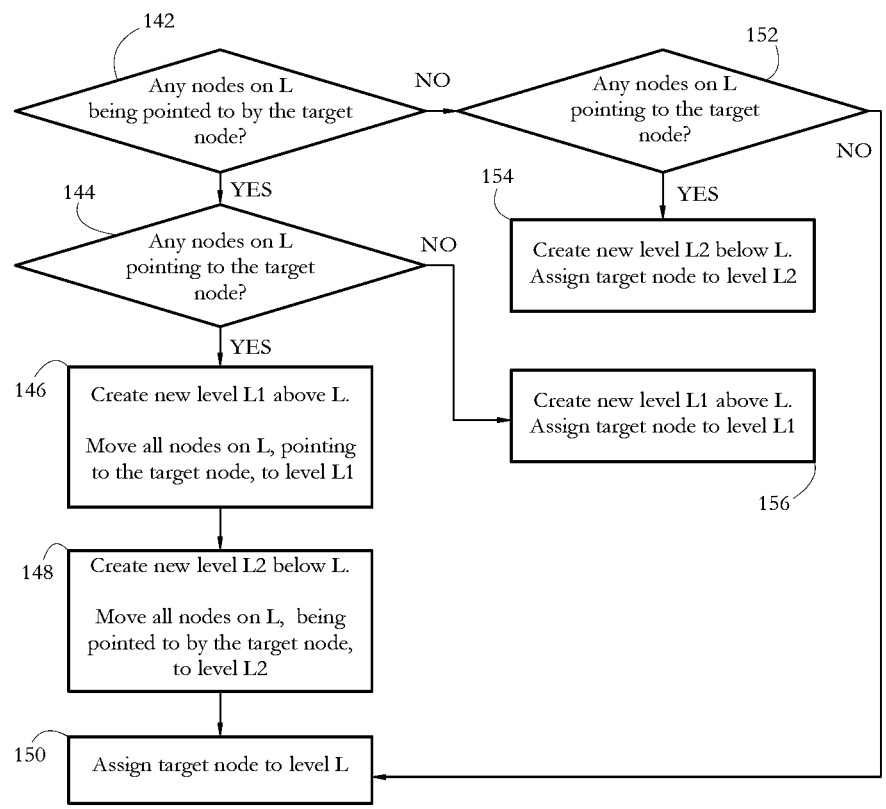
FIG. 9 shows an exemplary sequence of steps performed by the network ordering engine to assign a node to a level according to some embodiments of the present invention.

Next, in a step 110, network ordering engine 26 may assign the target node to the best level determined in step 108, or may create a new level to accommodate the target node. FIG. 9 shows an exemplary sequence of steps performed to carry out step 110, according to some embodiments of the present invention. In FIG. 9, L denotes the level identified in step 108 as being the best level for accommodating the target node. In a step 142, engine 26 may determine whether there are nodes on level L, which are pointed to by the target node (indicating that the target node should be placed on a level higher than L). For instance, such a determination may comprise determining whether the value of _ascendOptionCounter for level L is non-zero. If yes, a step 144 determines whether there are nodes on level L, which point to the target node (indicating that the target node should be placed on a level lower than L). In some embodiments, step 144 comprises determining whether the value of _descendOptionCounter for level L is non-zero. If yes, in a step 146, engine 26 may create a new level $L_1$ above L, and move all nodes previously assigned to level L, and pointing to the target node, to the new level $L_1$. Next, in a step 148, engine 26 may create a new level $L_2$ below L, and move all nodes previously assigned to level L, and being pointed to by the target node, to level $L_2$. Next, a step 150 assigns the target node to level L.

When the answer to step 144 is no, in a step 156, engine 26 may create a new level $L_1$ above L, and assign the target node to level $L_1$. When the answer to step 142 is no, a step 152 determines whether there are nodes on level L, pointing to the target node (indicating that the target node should be placed on a level lower than L). If yes, a step 154 creates a new level $L_2$ below L, and assigns the target node to level $L_2$. If no, engine 26 proceeds to step 150 and assigns the target node to level L.

After assigning all nodes of network 28 to levels, some embodiments of network ordering engine 26 remove all edges incompatible with said assignment (step 114 in FIG. 7). For instance, in the embodiment illustrated in FIGS. 5, 7, 8, and 9, step 114 comprises removing all edges pointing upward (from a node assigned to a lower level to a node assigned to an upper level). Step 114 completes the process of transforming lexicon network 28 into OLN 30.

FIG. 10-A-K show a succession of stages of transforming an exemplary unordered lexicon network into an ordered lexicon network according to the algorithm described above. FIG. 10-A shows an exemplary unordered lexicon network fed as input to engine 26. FIG. 10-B shows a first stage of ordering, wherein nodes are sorted and placed on a generic bottom level (B) and a generic top level (T). FIGS. 10-C through 10-J show stages of ordering of the network following the assignment of each of the nodes $S_1$-$S_8$. FIG. 10-K shows the resulting ordered lexicon network, comprising nine nodes distributed on five ascending levels 1-5. Of the nine nodes, three are universals ($S_1$, $S_2$, and $S_3$), and two are primitives ($S_6$ and $S_9$). Three of the edges of the unordered network were removed (depicted as dashed lines pointing upward).

Figure 11:
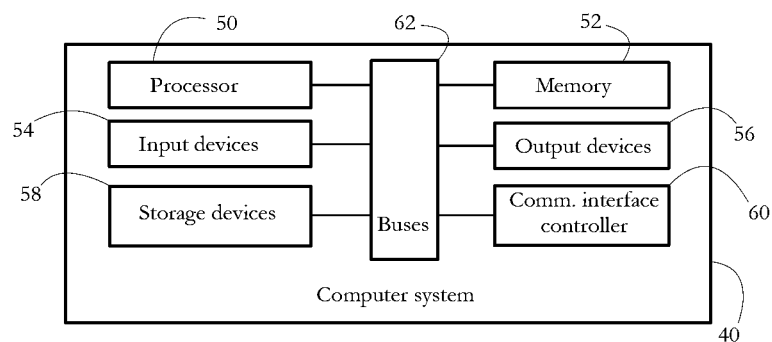
FIG. 11 shows an exemplary hardware configuration of a computer system executing a network ordering engine (FIG. 2) according to some embodiments of the present invention.

FIG. 11 shows an exemplary computer system 40 configured to execute some of the methods of the present invention, such as the procedures carried out by network ordering engine 26 and disambiguation engine 14, among others. System 40 may represent an enterprise server, or an end-user device such as a personal computer, a tablet computer, or a smartphone, among others. In some embodiments, system 40 comprises a set of physical devices, including a processor 50, a memory unit 52, a set of input devices 54, a set of output devices 56, a set of storage devices 58, and a communication interface controller 60, all connected by a set of buses 62.

In some embodiments, processor 50 comprises a physical device (e.g. multi-core integrated circuit) configured to execute computational and/or logical operations with a set of signals and/or data. In some embodiments, such logical operations are delivered to processor 50 in the form of a sequence of processor instructions (e.g. machine code or other type of software). Memory unit 52 may comprise volatile computer-readable media (e.g. RAM) storing data/signals accessed or generated by processor 50 in the course of carrying out instructions. Input devices 54 may include computer keyboards, mice, and microphones, among others, including the respective hardware interfaces and/or adapters allowing a user to introduce data and/or instructions into system 40. Output devices 56 may include display devices such as monitors and speakers among others, as well as hardware interfaces/adapters such as graphic cards, allowing system 40 to communicate data to a user. In some embodiments, input devices 54 and output devices 56 may share a common piece of hardware, as in the case of touch-screen devices. Storage devices 58 include computer-readable media enabling the non-volatile storage, reading, and writing of software instructions and/or data. Exemplary storage devices 58 include magnetic and optical disks and flash memory devices, as well as removable media such as CD and/or DVD disks and drives. Communication interface controller 60 enables system 40 to connect to a computer network and/or to other devices/computer systems. Exemplary controllers 60 include network adapters, among others. Buses 62 collectively represent the plurality of system, peripheral, and chipset buses, and/or all other circuitry enabling the inter-communication of devices 50-60 of system 40. For example, buses 62 may comprise the northbridge connecting processor 50 to memory 52, and/or the southbridge connecting processor 50 to devices 54-60, among others.

Figure 12:
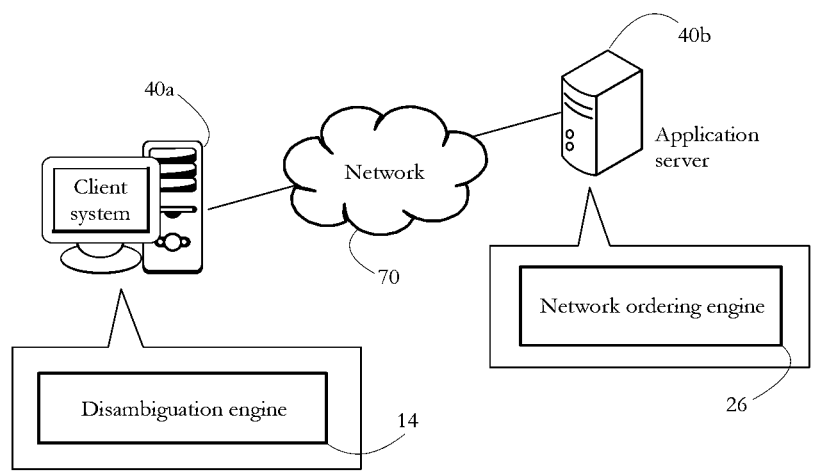
FIG. 12 shows an exemplary multiple-computer system, wherein a client computer system is configured to execute word sense disambiguation operations, and a server computer system is configured to construct an ordered lexicon network according to some embodiments of the present invention.

FIG. 12 shows an exemplary word sense disambiguation system including a client computer system 40a and an application server computer system 40b connected to client computer system 40a via a communication network 70. Systems 40a-b may be configured, for instance, as illustrated in FIG. 11. Network 70 may be a wide-area network such as the Internet, while parts of network 70 may also include a local area network (LAN). Application server 40b may be embodied as a single physical machine, or as a plurality of physical machines interconnected by parts of network 70.

In an exemplary embodiment, application server 14 executes network ordering engine 26 to produce OLN 30 as described above (see, e.g., FIG. 4), while client system 40a executes disambiguation engine 14 to produce disambiguation indicator 22 (see e.g., FIG. 1). Such an embodiment could represent, for example, a WSD system for human-computer interface applications, wherein OLN 30 is computed at a central location, while disambiguation engine 14 is widely distributed to a multitude of clients. Engine 14 may maintain a local copy of OLN 30 on computer-readable media of client system 40a, keeping the copy up to date via periodic and/or on-demand software updates from application server 40b. Alternatively, disambiguation engine 14 may access OLN data remotely, by initiating a data exchange transaction with application server 40b, the transaction comprising, for instance, selectively retrieving OLN data from server 40b by means of a query.

The exemplary systems and methods described above allow a word sense disambiguation (WSD) system to input a block of text formulated in a natural language and to automatically determine a sense (meaning) of a set of tokens in said block of text. Such disambiguation may be further used in various applications, such as human-machine interfaces (e.g., speech and handwriting recognition), search engine applications, and automated translation applications, among others.

In some embodiments, a disambiguation engine employs a lexicon network, comprising a set of nodes connected by a set of directed edges. In such an exemplary lexicon network, each node represents a gloss (meaning) of a lexicon entry (e.g., word) of the respective natural language, and wherein a connection between two nodes $G_A \rightarrow G_B$ signifies that gloss $G_A$ of word A contains a word B, whose gloss is $G_B$. Such lexicon networks are typically very large data structures, comprising hundreds of thousands of nodes and millions of edges.

Instead of employing the lexicon network in an unprocessed form, some embodiments of the present invention transform the lexicon network prior to word sense disambiguation, to produce an ordered lexicon network (OLN). The OLN may provide a substantially more compact representation of the lexicon network of the respective lexicon, by removing some of the redundancy inherent to the unprocessed lexicon network. Such redundancy may be caused by the fact that dictionary definitions (glosses) are often self-referencing. For instance, when a set of words have similar meanings, their glosses may have a substantial amount of words in common; in such cases, the lexicon network is likely to contain loops, i.e., directed cycles such as A→B→C→A.

In some embodiments, producing the ordered lexicon network comprises removing several edges of the unordered lexicon network, to break such loops. Ordering the lexicon network may proceed according to a topological ordering algorithm, also known in the art as a topological sort. For instance, nodes of the lexicon network may be arranged in an ordered sequence, the position of each node within the sequence being chosen so that all edges point is the same direction. In one exemplary arrangement, when A→B, node A is always placed in the sequence before node B.

When there is no ordered sequence of nodes which satisfies all edge direction constraints, some edges of the lexicon network may be removed to allow for a solution wherein all remaining edges point in the same direction.

In some embodiments, the position of a node within a sequence is determined according to a numerical weight factor attached to an edge connected to the respective node. Edge weights may indicate that some edges (i.e., semantic relationships) are deemed more significant than others, so, for instance, instead of removing an important edge, it may be preferable to re-arrange a set of nodes and to remove a less important edge.

An exemplary method of assigning weights to edges comprises estimating a relative relevance of each token of a gloss. For instance, a gloss for "cat" may read "a small domesticated carnivorous mammal with soft fur, a short snout, and retractile claws". In some embodiments, the words "domesticated", "carnivorous", "fur", and "claws" may be deemed more semantically relevant to the definition of a cat than the words "short", "retractile", and "snout", for instance. In some embodiments, an edge connecting the gloss for "cat" to the gloss for "carnivorous" may be assigned a larger weight than an edge connecting the gloss for "cat" to the gloss for "short".

It will be clear to one skilled in the art that the above embodiments may be altered in many ways without departing from the scope of the invention. Accordingly, the scope of the invention should be determined by the following claims and their legal equivalents.

What is claimed is:

1. A computer system comprising at least one processor configured to transform a lexicon network stored in memory, the lexicon network comprising a plurality of nodes and a plurality of edges, wherein:
   each node of the lexicon network comprises a gloss of a lexicon entry of a natural language;
   each edge of the lexicon network comprises a direction and a weight;
   wherein creating the lexicon network comprises receiving an input indicative of a direction of an edge connecting a first node of the lexicon network to a second node of the lexicon network;
   wherein transforming the lexicon network comprises ordering the lexicon network by distributing the plurality of nodes among a plurality of levels, the plurality of levels arranged in an ordered sequence, so that all edges of the ordered lexicon network point in the same direction relative to the ordered sequence of levels;
   wherein ordering the lexicon network comprises assigning the first node of the lexicon network to a first level of the plurality of levels the first level selected according to the direction of the edge connecting the first and second nodes, and further according to a first penalty score determined for a first subset of edges of the lexicon network, the first subset of edges selected for removal from the lexicon network according to a tentative assignment of the first node to the first level, the first penalty score determined according to the weight of at least one edge of the first subset of edges, wherein the weight of the at least one of the first subset of edges is indicative of a semantic importance of the at least one of the first subset of edges compared to other edges of the lexicon network; and
   wherein the at least one processor is further configured to transmit at least part of the ordered lexicon network to a second computer system, wherein the second computer system is configured to:
   receive electronic natural language text,
   perform, via a word sense disambiguation engine, word sense disambiguation on the received electronic natural language text according to the at least part of the ordered lexicon network, and
   output a disambiguation indicator based on the word sense disambiguation to a computer-based application.

2. The computer system of claim 1, wherein selecting the first subset of edges of the lexicon network comprises including a target edge into the first subset of edges according to a direction of the target edge.

3. The computer system of claim 2, wherein the second node is assigned to a second level of the plurality of levels, and wherein assigning the first node comprises:
   when the first node points to the second node, selecting the first level so that the first level precedes the second level in the ordered sequence; and
   when the second node points to the first node, selecting the first level so that the second level precedes the first level in the ordered sequence.

4. The computer system of claim 3, wherein the target edge points from a third node to a fourth node of the lexicon network, and wherein selecting the first subset of edges comprises:
   identifying a third level and a fourth level of the ordered sequence, wherein the third node is assigned to the third level, and wherein the fourth node is assigned to the fourth level; and
   in response, including the target edge into the first subset of edges when the fourth level precedes the third level in the ordered sequence.

5. The computer system of claim 2, wherein the second node is assigned to a second level of the plurality of levels, and wherein assigning the first node comprises:
   when the first node points to the second node, selecting the first level so that the second level precedes the first level in the ordered sequence; and
   when the second node points to the first node, selecting the first level so that the first level precedes the second level in the ordered sequence.

6. The computer system of claim 5, wherein the target edge points from a third node to a fourth node of the lexicon network, and wherein selecting the first subset of edges comprises:
   identifying a third level and a fourth level of the ordered sequence, wherein the third node is assigned to the third level, and wherein the fourth node is assigned to the fourth level; and
   in response, including the target edge into the first subset of edges when the third level precedes the fourth level in the ordered sequence.

7. The computer system of claim 2, wherein ordering the lexicon network further comprises, in response to selecting the first subset of edges, removing the first subset of edges from the lexicon network.

8. The computer system of claim 2, wherein transforming the lexicon network further comprises, in response to selecting the first subset of edges:

selecting a second subset of edges of the lexicon network for removal from the lexicon network, the second subset selected according to a tentative assignment of the first node to a second level of the plurality of levels;

evaluating a second penalty score for the second subset of edges, the second penalty score determined according to a weight of at least one of the second subset of edges;

comparing the first penalty score to the second penalty score; and in response, when the first penalty score exceeds the second penalty score, assigning the first node to the second level.

9. The computer system of claim 1, wherein each edge of the lexicon network points from a source gloss to a destination gloss, and wherein the each edge indicates that a token of the source gloss has a meaning defined by the destination gloss.

10. The computer system of claim 1, wherein the first penalty score is determined further according to a count of edges of the first subset of edges.

11. A method comprising employing at least one processor of a computer system to transform a lexicon network stored in memory, the lexicon network comprising a plurality of nodes and a plurality of edges, wherein:

each node of the lexicon network comprises a gloss of a lexicon entry of a natural language;

each edge of the lexicon network comprises a direction and a weight;

wherein creating the lexicon network comprises receiving an input indicative of a direction of an edge connecting a first node of the lexicon network to a second node of the lexicon network;

wherein transforming the lexicon network comprises ordering the lexicon network by employing the at least one processor to distribute the plurality of nodes among a plurality of levels, the plurality of levels arranged in an ordered sequence, so that all edges of the ordered lexicon network point in the same direction relative to the ordered sequence of levels;

wherein ordering the lexicon network comprises employing the at least one processor to assign a first node of the lexicon network to a first level of the plurality of levels, the first level selected according to the direction of the edge connecting the first and second nodes, and further according to a first penalty score determined for a first subset of edges of the lexicon network, the first subset of edges selected for removal from the lexicon network according to a tentative assignment of the first node to the first level, the first penalty score determined according to the weight of at least one edge of the first subset of edges, wherein the weight of the at least one of the subset of edges is indicative of a semantic importance of the at least one of the subset of edges, compared to other edges of the lexicon network; and wherein the method further comprises transmitting at least part of the ordered lexicon network to a second computer system, wherein the second computer system is configured to:

receive electronic natural language text, perform, via a word sense disambiguation engine, word sense disambiguation on the received electronic natural language text according to the at least part of the ordered lexicon network, and output a disambiguation indicator based on the word sense disambiguation to a computer-based application.

12. The method of claim 11, wherein selecting the first subset of edges of the lexicon network comprises including a target edge into the first subset of edges according to a direction of the target edge.

13. The method of claim 12, wherein the second node is assigned to a second level of the plurality of levels, and wherein assigning the first node comprises:

when the first node points to the second node, selecting the first level so that the first level precedes the second level in the ordered sequence; and when the second node points to the first node, selecting the first level so that the second level precedes the first level in the ordered sequence.

14. The method of claim 13, wherein the target edge points from a third node to a fourth node of the lexicon network, and wherein selecting the first subset of edges comprises:

identifying a third level and a fourth level of the ordered sequence, wherein the third node is assigned to the third level, and wherein the fourth node is assigned to the fourth level; and in response, including the target edge into the first subset of edges when the fourth level precedes the third level in the ordered sequence.

15. The method of claim 12, wherein the second node is assigned to a second level of the plurality of levels, and wherein assigning the first node comprises:

when the first node points to the second node, selecting the first level so that the second level precedes the first level in the ordered sequence; and when the second node points to the first node, selecting the first level so that the first level precedes the second level in the ordered sequence.

16. The method of claim 15, wherein the target edge points from a third node to a fourth node of the lexicon network, and wherein selecting the first subset of edges comprises:

identifying a third level and a fourth level of the ordered sequence, wherein the third node is assigned to the third level, and wherein the fourth node is assigned to the fourth level; and in response, including the target edge into the first subset of edges when the third level precedes the fourth level in the ordered sequence.

17. The method of claim 12, wherein transforming the lexicon network further comprises, in response to selecting the first subset of edges, employing the at least one processor to remove the first subset of edges from the lexicon network.

18. The method of claim 12, wherein transforming the lexicon network further comprises, in response to selecting the first subset of edges:

employing the at least one processor to select a second subset of edges of the lexicon network for removal from the lexicon network, the second subset selected according to a tentative assignment of the first node to a second level of the plurality of levels;

employing the at least one processor to evaluate a second penalty score determined for the second subset of edges, the second penalty score determined according to a weight of at least one of the second subset of edges;

employing the at least one processor to compare the first penalty score to the second penalty score; and in response, when the first penalty score exceeds the second penalty score, employing the at least one processor to assign the first node to the second level.

19. The method of claim 11, wherein each edge of the lexicon network points from a source gloss to a destination gloss, and wherein the each edge indicates that a token of the source gloss has a meaning defined by the destination gloss.

20. A client computer system comprising at least one processor configured to:
- receive from a server computer system a semantic indicator determined for a lexicon network of a natural language, the server computer system configured to perform transactions with a plurality of computer systems comprising the client computer system, wherein determining the semantic indicator comprises transforming the lexicon network; and
- in response to receiving the semantic indicator, determine a disambiguation of a text block formulated in the natural language, and output a result of the disambiguation to a computer-based application, the disambiguation indicative of a meaning of a token of the text block, the disambiguation determined according to the semantic indicator, wherein:
- each node of the lexicon network comprises a gloss of a lexicon entry of a natural language;
- each edge of the lexicon network comprises a direction and a weight;
- wherein creating the lexicon network comprises receiving an input indicative of a direction of an edge connecting a first node of the lexicon network to a second node of the lexicon network;
- wherein transforming the lexicon network comprises ordering the lexicon network by distributing the plurality of nodes among a plurality of levels, the plurality of levels arranged in an ordered sequence, so that all edges of the ordered lexicon network point in the same direction relative to the ordered sequence of levels; and
- wherein ordering the lexicon network comprises assigning a first node of the lexicon network to a first level of the plurality of levels, the first level selected according to the direction of the edge connecting the first and second nodes, and further according to a first penalty score determined for a first subset of edges of the lexicon network, the first subset of edges selected for removal from the lexicon network according to a tentative assignment of the first node to the first level, the first penalty score determined according to the weight of at least one edge of the first subset of edges, wherein the weight of the at least one of the subset of edges is indicative of a semantic importance of the at least one of the subset of edges, compared to other edges of the lexicon network.

* * * * *